United States Patent [19]

Weary

[11] 4,268,212
[45] May 19, 1981

[54] BOAT CART FOR TRAILERS

[76] Inventor: Robert D. Weary, 520 E. Carter Dr., Tempe, Ariz. 85282

[21] Appl. No.: 38,531

[22] Filed: May 14, 1979

[51] Int. Cl.³ .............................................. B60P 3/10
[52] U.S. Cl. ................................. 414/539; 280/414 R
[58] Field of Search ...................... 414/467, 477–480, 414/498–500, 522, 539, 559; 9/1.2; 280/414 R; 292/78, 216

[56] References Cited

U.S. PATENT DOCUMENTS

| 3,558,090 | 1/1971 | Bird | 292/216 X |
| 3,750,805 | 8/1973 | Finney | 280/414 R X |
| 3,831,790 | 8/1974 | Farris | 280/414 R X |
| 3,938,829 | 2/1976 | Anderson | 280/414 R |
| 3,963,263 | 6/1976 | Whitlock | 280/414 R |

Primary Examiner—Andres Kashnikow
Attorney, Agent, or Firm—Cahill, Sutton & Thomas

[57] ABSTRACT

A cart, transportable along rails in the bed of a boat trailer, engages an eyelet at the bow of the boat and guides the boat into and out of the water. Uprights at the rear of the trailer maintain the boat in alignment with the trailer and the boat supporting elements thereof during transport of the boat on and off the trailer. Automatic latches are employed to interconnect the boat with the cart and the cart with the trailer and thereby permit loading and unloading of the boat by one person.

8 Claims, 8 Drawing Figures

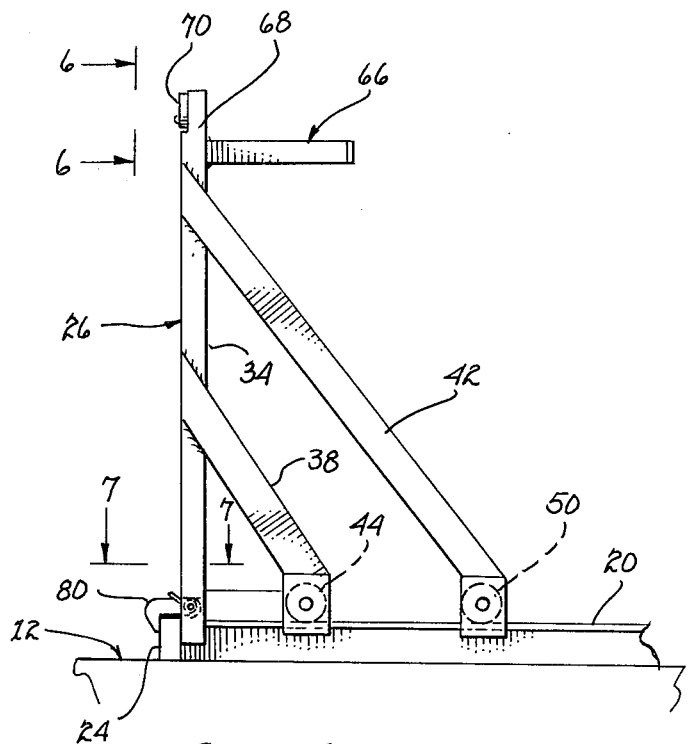
fig. 5
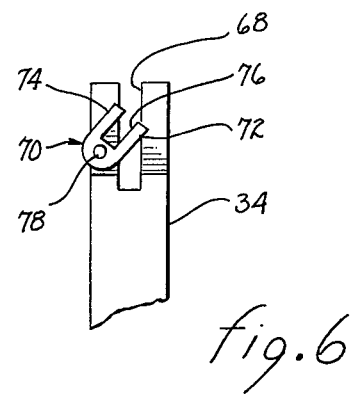
fig. 6
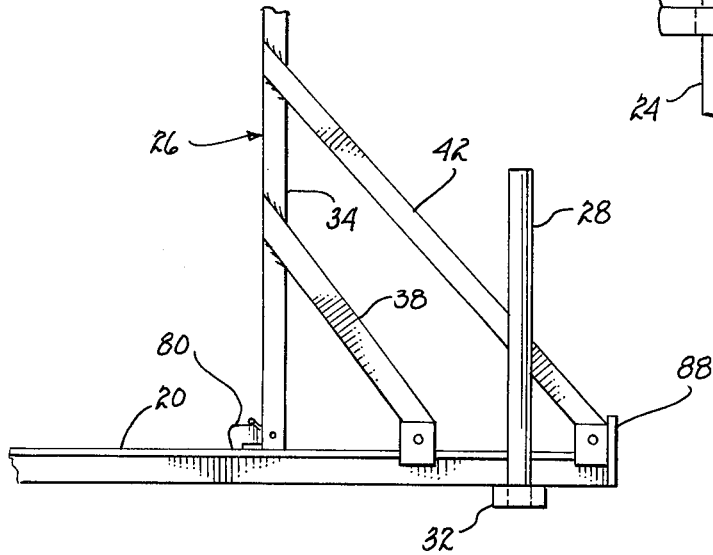
fig. 7
fig. 8

BOAT CART FOR TRAILERS

The present invention relates to boat trailers and, more particularly, to boat loading and unloading apparatus for trailers.

A large segment of boating enthusiasts, particularly those who use inland waters, transport their boats to and from the inland waters upon trailers. These trailers include padded boat support means and variously configured tiedowns for maintaining the boat upon the trailer for road travel.

Most conventional boat trailers include no mechanism for reasonably easily loading and unloading the boat. Consequently, most users immerse their trailers at the water's edge to a sufficient degree to allow the boat to float off the supporting members. The movement of the floating boat with respect to the trailer is essentially random dependent only upon the force of the wind and waves; hence two or more persons are usually required to control the movement of the boat and to bring it to a point on the beach or along a dock where the occupants may embark.

On loading of a boat upon this type of trailer, severe problems may arise in aligning the boat with the trailer should the wind be strong or the waves high and several persons are required to maintain the boat in place until it becomes supported upon the trailer.

To avoid the various problems associated with the loading and unloading of boats, various trailers have been developed. U.S. Pat. No. 4,011,958 illustrates a boat trailer having boat guide and retaining stanchions mounted at the rear of the trailer, which stanchions are laterally pivotable to release the boat from the trailer. U.S. Pat. No. 4,114,772 is directed to a trailer for pontoon boats wherein the supporting elements for the boat are vertically positionable to raise and lower the boat with respect to the trailer. U.S. Pat. No. 2,389,338 describes a trailer incorporating a boat supporting cradle, which cradle is translatable along the trailer to place the boat in and take it out of the water. U.S. Pat. No. 2,809,496 is directed to a boat supporting cradle, which cradle is translatable along the trailer and includes a wheel float or hollow drum to give buoyancy to the rear end of the cradle in the water and to support the rear end upon a ground surface. U.S. Pat. No. 3,963,263 is directed to a self-latching mechanism particularly adapted to boat trailers.

While each of the devices described in the above enumerated patents constitute an advance in the art of manipulating a boat on and off a trailer, some of the basic problems discussed earlier still abound. That is, the trailers and cradles still require handling of the boat to guide it off and on to either the trailer or the cradle; and, should the prevailing conditions be other than near complete calm, at least two persons must work together to prevent injury or damage. Moreover, none of these devices allow use of the propulsion device of the boat itself, if it is a motorboat, to unload and load the boat while the skipper is in the boat.

It is therefore a primary object of the present invention to provide a boat trailer which automatically guides a supported boat off of and on to the trailer.

Another object of the present invention is to provide apparatus for guiding a boat off of and on to the supporting members of a boat trailer under its own power.

Yet another object of the present invention is to provide an automatically engaging/disengaging cart on a boat trailer for guiding the boat on to and off of the supporting surfaces of the trailer.

A further object of the present invention is to provide a cart translatable along a boat trailer for locating and maintaining the boat in place.

A yet further object of the present invention is to provide a cart and guide posts which are readily incorporatable with existing boat trailers for eliminating most of the manual work generally attendant loading and unloading of the boat.

A still further object of the present invention is to provide an inexpensive translating and guiding apparatus for use with boat trailers.

These and other objects of the present invention will become apparent to those skilled in the art as the description thereof proceeds.

The present invention will be described with greater specificity and clarity with reference to the following drawings, in which:

FIG. 5 is a side view of the cart located at the front of the trailer;

FIG. 6 is a detailed view taken along lines 6—6, as shown in FIG. 5;

FIG. 7 is a partial view taken along lines 7—7, as shown in FIG. 5; and

FIG. 8 is a side view illustrating the cart located at the rear of the trailer.

Figure 1:
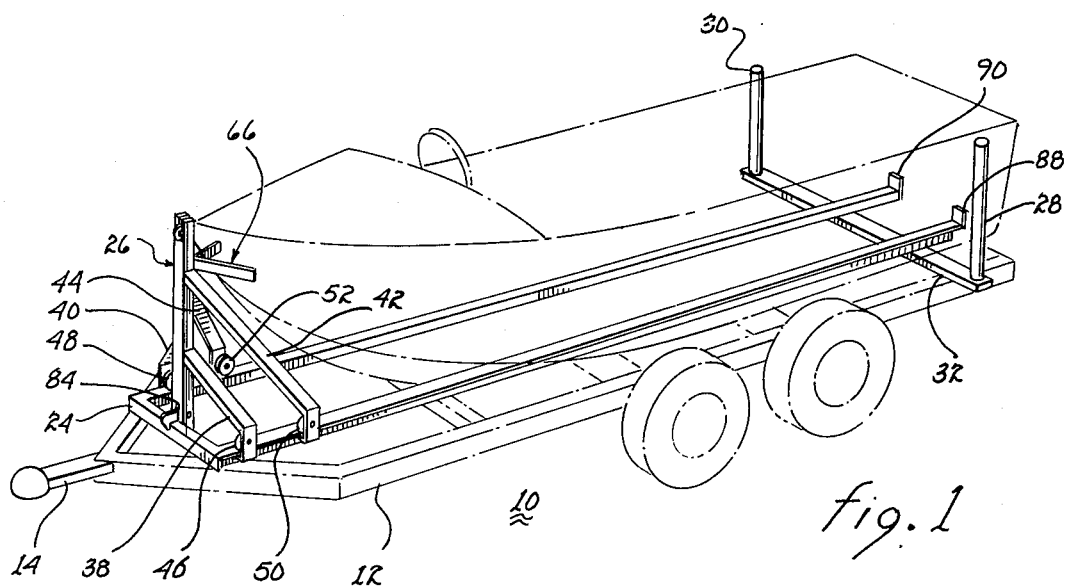
FIG. 1 is a perspective view illustrating a boat trailer supporting a boat.
Figure 2:
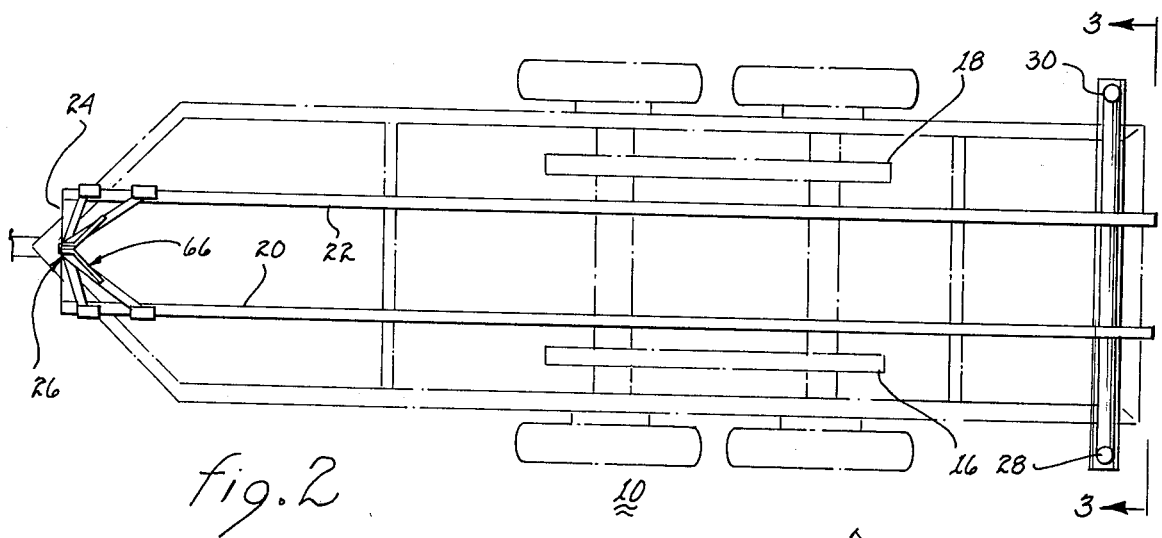
FIG. 2 is a top view of the boat trailer.
Figure 3:
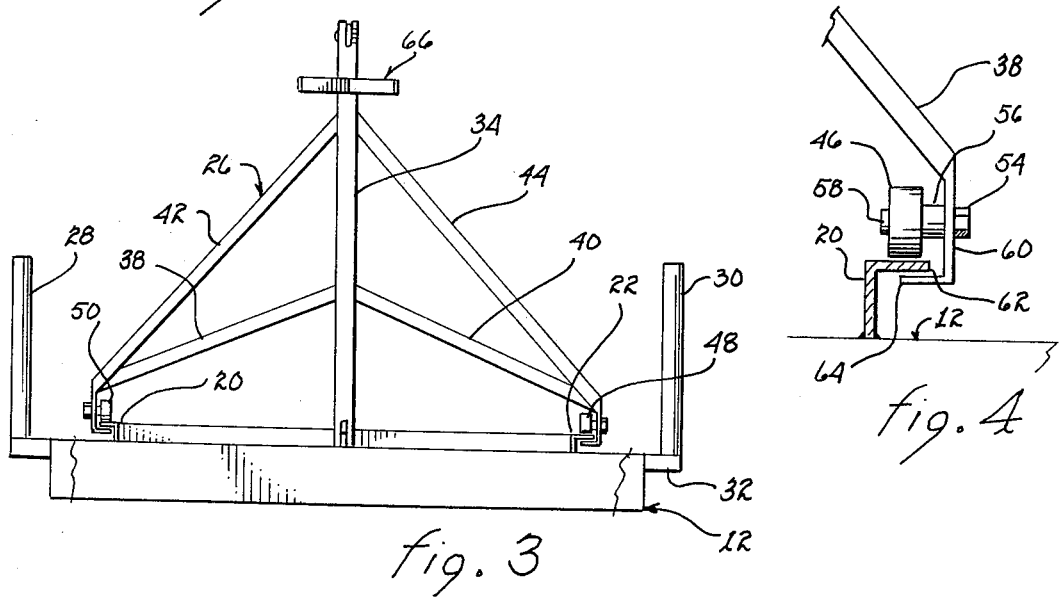
FIG. 3 is a partial end view taken along lines 3—3, as shown in FIG. 2.

FIGS. 1 and 2 illustrate a boat trailer 10, which trailer includes an open bay framework bed 12. A hitch 14 extends forwardly from the bed for attaching the trailer to a vehicle. Depending upon the weight of the boat to be supported, a pair of axel supported wheels or tandem wheels, as shown, support the trailer. Conventional padded supports, such as supports 16 and 18, may be employed to support and maintain the boat upon the trailer during road use.

A pair of rails 20 and 22 are attached to and extend along bed 12 from the front to the rear of the trailer. These rails may be interconnected at the front of the trailer by means, such as cross-arm 24. The rails support cart 26. At the rear end of trailer 10, a pair of uprights 28 and 30 are secured to bed 12 or to a component thereof, such as cross-member 32. These uprights are positioned laterally so as to be displaced from one another a distance somewhat greater than the beam of the boat.

Referring particularly to FIGS. 3, 4, 5 and 8, cart 26 will be described in further detail. Pairs of braces 38, 40 and 42, 44 are attached to and depend from stanchion 34 to support the stanchion in an essentially vertical orientation. Rollers 46, 48, 50 and 52 are attached by any of several conventional journaling means to the lower ends downwardly extending flanges of braces 38, 40, 42 and 44, respectively. These rollers contactingly engage the respective upper surfaces of rails 20 and 22 to permit translation of cart 26 along the rails.

Figure 4:
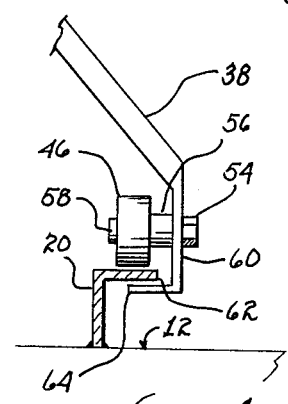
FIG. 4 is a partial detail view.

As particularly illustrated in FIG. 4, journaling means such as bolt 54, spacer 56 and nut 58 may be employed to secure roller 46 to depending flange 60 of brace 38. The depending flange extends vertically below edge 62 of rail 20; thereby, the resulting interfering contact precludes more than minimal inward lateral movement of the brace with respect to rail. As the lower ends or flanges of the remaining braces are similarly constricted in lateral movement, braces 38 and 42 are precluded from moving in one direction and braces 40 and 44 are precluded from movement in the other direction resulting in maintenance of the rollers upon their respective rails during translation of cart 26 along the trailer bed. Similarly, skewing of the cart with respect to the rails is precluded. The rollers, of course, preclude downward movement of cart 26. Inwardly oriented lip 64, extending from the lower end of flange 60 beneath an overhanging portion of rail 20, precludes upward vertical displacement of brace 38. The flanges at the lower ends of braces 40, 42 and 44 are equiped with a similar lip extending beneath an overhanging portion of the respective rail. Thereby, upward vertical movement of cart 26 is precluded.

Cart 26 includes a rearward opening V-shaped guide 66. This guide contactingly mates with the bow of the supported boat to maintain the bow centered upon stanchion 34.

All boats include an eye at the bow of the boat for attachment thereto of a mooring line or the like. By engaging this eyelet with the upper end of stanchion 34, the boat will become secured to the cart. Referring to FIGS. 5 and 6, there is shown a vertical slot 68 extending fore and aft through stanchion 34. The slot is of a width commensurate with the eyelet at the bow and of a depth commensurate with the height of the bow above bed 12 of trailer 10 when the boat rests upon supports 16 and 18 of the trailer.

Initial retention of the eyelet within slot 68 is effected by a pivoting U-shaped lock member 70. The lock member includes legs 72 and 74, which legs are displaced from one another to define recess 76. Pivot means, such as a pin 78, pivotally secures the lock member to stanchion 34.

Engagement of the eyelet at the bow of the boat with slot 68 may be described as follows. When guide 66 of the cart is brought into engagement with the bow of the boat, the eyelet will become vertically aligned with the slot at a point upwardly displaced from lock member 70. As the eyelet is lowered within the slot, due to movement of the boat and cart along rails 20,22 resulting in a raising of the cart with respect to the floating boat because the trailer is tilted, the lower edge of the eyelet will enter recess 76 and exert a downward force upon the inner edge of leg 72. Such downward force will result in pivotal movement of lock member 70 and result in penetration of leg 74 through the eyelet. Thereby, fore and aft movement of the eyelet with respect to the stanchion becomes precluded by the lock member. Vertical movement of the eyelet with respect to the stanchion during road travel may be prohibited by securing the lock member in place or by other means, such as a cable or a chain interconnecting some portion of the boat with the cart or trailer itself.

Cart 26 is lockingly secured to the front end of rails 20 and 22 by means of latch 80, as shown particularly in FIGS. 5 and 7. The lower end of stanchion 34 extends beneath the upper surface of cross-arm 24. On movement of cart 26 forwardly, the stanchion will contact the rear surface of the cross-arm, which contact will preclude further forward movement of the cart. The cart is secured against the cross-arm by means of latch 80 lockingly engaging with the cross-arm. The latch is spring loaded by means of spring 82 to effect automatic locking upon positioning of the cart in abutting relationship to the cross-arm. As illustrated, latch 82 is pivotally attached to stanchion 34 within slot 84 by a pin 86 extending through the stanchion and the latch. It is to be understood that the latch may, in the alternative, be pivotally secured to either side of the stanchion.

Stops 88 and 90 are disposed at the rear ends of rails 20 and 22, respectively. These stops interferingly engage the lower ends of braces 42 and 44 to prevent rearward movement of cart 26 off of the trailer.

The operation of unloading and loading a boat upon trailer 10 may be described as follows. Upon arrival at the water's edge, any locking means other than lock member 70 employed to secure the boat to cart 26 or to trailer bed 12 is unlocked. The trailer is backed into the water until the buoyancy of the boat raises the boat partially or completely off supports 16 and 18. At this point, the boat is still secured to cart 26 by lock member 70 and maintained in general longitudinal alignment with the trailer by uprights 28 and 30. After releasing latch 80, the boat operator can get into the boat and start the motor or propulsion unit. By moving the geared level to "reverse", a force is generated to cause the boat to back out of the trailer. As the boat is still connected to cart 26 through lock member 70 engaging the eyelet at the bow, the cart will translate rearwardly along rails 20 and 22. During translation of the boat, the lateral movement restraint provided by uprights 28 and 30 will maintain the boat in longitudinal alignment with the trailer. At some point along the translation of cart 26 upon rails 20 and 22, the eyelet of the bow, due to vertically downward movement of the cart along the slope of the trailer and essentially horizontal floating movement of the boat will result in relative upward movement of the eyelet with respect to lock member 70. Such upward movement is accommodated by pivotal movement of the lock member until the eyelet is free to drift clear of slot 68. At this point, the boat is no longer connected to the trailer and once the bow is clear of uprights 28 and 30, full navigational freedom is at hand.

From the above description, it will be evident that unloading of the boat may be a one man operation and the presence of wind or waves has little effect upon the difficulty of unloading the boat. It may be noted that cart 26 will remain in engagement with rails 20 and 22 due to stops 88 and 90 at the rear end of the rails.

Loading of the boat on trailer 10 is a reversal of the above process. More particularly, assuming that the trailer has already been backed into the water to a depth sufficient to allow the boat to float onto supports 16 and 18, the boat, under power, is directed between uprights 28 and 30 into contacting relationship with guide 66 extending from stanchion 34 of cart 26. On engagement of the bow with guide 66, the eyelet at the bow will automatically be in vertical alignment with slot 68. Further forward movement of the boat, will result in relative upward movement with the cart with respect to the boat as the cart is forced to the front of the tilted trailer along rails 20, 22. At some point during the translatory movement, the bow will be lowered within slot 68 to a sufficient degree to permit locking engagement of lock member 70 with the eyelet. Upon such engagement, further fore and aft movement of the boat with respect to the cart is precluded. While the boat is brought under its own power onto the trailer, uprights 28 and 30, operating in conjunction with cart 26, maintain the boat in general longitudinal alignment with the trailer. When the boat has forced cart 26 to the front of the rails, upright 34 will abutt cross-arm 24 and latch 80 will lock the cart to the cross-arm. Thereafter, the operator may shut down the motor of the boat and draw the trailer out of the water. As the trailer is being drawn out, the boat will settle upon supports 16 and 18 in perfect alignment therewith because of the positional guidance provided by uprights 28 and 30 and cart 26. At some further convenient time, the operator may attach whatever straps, cables or chains he wishes to secure the boat to the trailer and prevent relative movement therebetween as a result of transport on a road.

From the above description it may be noted that loading of the boat onto the trailer can be a one man operation and the self-guiding elements of the trailer render incidental any alignment disturbing effects of wind or waves.

While the principles of the invention have now been made clear in an illustrative embodiment, there will be immediately obvious to those skilled in the art many modifications of structure, arrangement, porportions, elements, materials, and components, used in the practice of the invention which are particularly adapted for specific environments and operating requirements without departing from those principles.

I claim:

1. Apparatus for aiding the loading and unloading of a boat upon and off of supports on a boat trailer, said apparatus comprising in combination:
   (a) rail means secured to the boat trailer and extending in general longitudinal alignment therewith;
   (b) a cart translatable along said rail means for engaging and capturing the bow of the boat which bow includes a forwardly extending eyelet, said cart including:
      i. roller means for supporting and maintaining said cart upon said rail means during translation of said cart,
      ii. means for precluding lateral and vertical movement of said cart relative to said rail means,
      iii. upwardly extending stanchion means for interconnecting the bow of the boat, with said cart,
      iv. lock means for retaining the bow of the boat in engagement with said stanchion means, said lock means including a vertically oriented slot extending downwardly in said stanchion means for penetrably receiving the eyelet at the bow of the boat a lock member having at least one leg dimensioned to penetrably engage the eyelet upon insertion of the eyelet through said slot, said lock member being pivotally secured to said stanchion and pivotally responsive to vertical downward and upward movement of the eyelet through said slot and including means for engaging and disengaging, respectively, said one leg with the eyelet and preclude, on engagement, fore and aft motion of the boat with respect to said cart;
   (c) uprights extending from the trailer for guiding the boat along the trailer during translation of said cart along said rail means;

whereby, said cart and said uprights guide the boat on to and off of the trailer and the supports thereof during loading and unloading of the boat.

2. The apparatus as set forth in claim 1 wherein said engaging and capturing means includes a vee shaped guide for mating with the bow of the boat.

3. The apparatus as set forth in claim 2 including latch means for securing said cart at the front of the trailer.

4. The apparatus as set forth in claim 3 wherein said rail means includes a cross-arm disposed at the front of the trailer for limiting forward travel of said cart.

5. The apparatus as set forth in claim 4 wherein said latch means latches with said cross-arm.

6. The apparatus as set forth in claim 3 wherein said uprights are disposed in proximity to the rear of the trailer.

7. The apparatus as set forth in claim 6 including stop means disposed at the rear of said rail means for limiting the extent of rearward travel of said cart along said rail means.

8. The apparatus as set forth in claim 1 wherein said lock member includes a pair of legs separated by a recess, said recess being dimensioned to receive intermediate said pair of legs a segment of the eyelet, whereby, upon downward movement of the eyelet through said slot a force is exerted upon the other of said pair of legs by the eyelet segment to force said one leg into penetrable engagement with said eyelet.

* * * * *